United States Patent [19]
Viken

[11] Patent Number: 6,105,635
[45] Date of Patent: Aug. 22, 2000

[54] SELF REGULATING VALVE FOR A FLUID EXCHANGE APPARATUS

[76] Inventor: James P. Viken, 9890 Crestwood Ter., Eden Prairie, Minn.

[21] Appl. No.: 09/235,561

[22] Filed: Jan. 22, 1999

Related U.S. Application Data

[60] Provisional application No. 60/072,289, Jan. 23, 1998.
[51] Int. Cl.[7] .............................. F16C 3/14; F16N 33/00
[52] U.S. Cl. ........................... 141/98; 184/1.5; 184/106; 137/115.13
[58] Field of Search ................................. 141/59, 65, 98; 184/1.5, 106; 137/115.13, 115.14, 115.15, 115.16, 115.21, 87.05

[56] References Cited

U.S. PATENT DOCUMENTS

| | | | |
|---|---|---|---|
| 5,337,708 | 8/1994 | Chen | 123/198 |
| 5,427,202 | 6/1995 | Behring et al. | 184/1.5 |
| 5,447,184 | 9/1995 | Betancourt | 141/98 |
| 5,472,064 | 12/1995 | Viken | 184/1.5 |
| 5,626,170 | 5/1997 | Parker | 141/98 |
| 5,743,357 | 4/1998 | Few | 184/1.5 |
| 5,806,629 | 9/1998 | Dixon et al. | 184/1.5 |

*Primary Examiner*—Henry J. Recla
*Assistant Examiner*—Peter DeVore
*Attorney, Agent, or Firm*—Larkin, Hoffman, Daly & Lindgren, Ltd.; John F. Klos

[57] ABSTRACT

A self-regulating valve assembly for use with a fluid exchange system for matching fluid in-flow and out-flow from an accessed hydraulic system. Particular applicability of the valve assembly is found in fluid exchange systems for vehicle automatic transmissions. An external pump assembly may be regulated by the valve assembly to match the introduction of fluid into the vehicle automatic transmission with a flow rate of fluid extracted therefrom.

17 Claims, 3 Drawing Sheets

SELF REGULATING VALVE FOR A FLUID EXCHANGE APPARATUS

RELATED APPLICATION

This application claims the benefit of priority pursuant to 35 USC § 119(e)(1) from the provisional patent application filed pursuant to 35 USC §111(b): as Ser. No. 60/072,289 on Jan. 23, 1998.

BACKGROUND OF THE INVENTION

1. Field of the Invention

The present invention relates to a self-regulating valve assembly for use with a fluid exchange system for matching fluid in-flow and out-flow from an accessed hydraulic circulation circuit, more particularly such as an automatic transmission fluid cooling circuit.

2. Background of the Invention

Devices and methods of use thereof for exchanging used automatic transmission fluid (ATF) with fresh ATF from an automotive transmission have recently been widely accepted. Such devices may access the fluid cooling circuit of an automobile and introduce fresh fluid at a predetermined flow rate while simultaneously extracting a similar predetermined flow rate of used fluid from the cooling circuit. Earlier advances in the art, for example, include U.S. Pat. Nos. 5,318,080 and 5,472,064, both to Viken, and both herein incorporated by reference. The importance of balancing fluid introduction and extraction is also widely recognize. Accordingly, it is desirable to maintain approximate parity between the introduction of fresh fluid into an automatic transmission and the extraction of used fluid out of the transmission in a fluid exchange apparatus while performing an exchange of the transmission's used fluid for fresh fluid.

A need has developed for devices and methods for use thereof for exchanging used hydraulic fluid with fresh hydraulic fluid in a closed or open loop hydraulic systems. Such devices would desirably access a hydraulic circuit and introduce fresh hydraulic fluid at a predetermined flow rate while simultaneously extracting a similar predetermined flow rate of used hydraulic fluid from the access circuit.

Many prior art devices have relied on operator or other intervention to monitor and control an external pump which introduces fresh fluid at a balanced rate in an exchange system. Operator control of the fluid pump is an obvious limitation in that exchange performance relies on the relative skill of operator.

Finally, many machines and methodologies have recently been developed for ATF exchanges of automobiles. However, the devices and methods have typically been relatively complex in design and application. A need exists for a simple, fail-safe automatic transmission fluid exchange device.

SUMMARY OF THE INVENTION

Addressing the deficiencies of the conventional art, the instant invention resolves the problems in an efficient, and cost effective manner. The instant invention can be adapted for use in hydraulic fluid exchanging systems or applications (and other than for automatic transmissions) where it is desirable to match fluid flows entering and exiting the fluid system.

One aspect of the present invention provides a pump and valve assembly for balancing the introduction and extraction of fluid into and out of an automatic transmission system during a fluid exchange procedure.

Another aspect of the present invention provides an energy-efficient bypass or default mode of substantially limiting the pump load while the unit is a non-exchanging mode.

Yet another aspect of the present invention is the automatic nature of the device which does not require operator intervention during the exchange process. Importantly, an operator is not required to manually activate the pump once the automobile is started. The unit according to the present invention allows the apparatus to be interconnected to the transmission cooling circuit of an unstarted automobile with the external fresh fluid pump turned on. Activation of the vehicle functions to fluidly activate the valve assembly which couples the external pump's output to the fluid circulation line and simultaneously balances the flow rate of exchanged ATF fluid. This automatic start feature simplifies the fluid exchange procedure. When the exchange procedure has finished the engine may be turned off to render the transmission inoperative. The valve assembly then fluidly uncouples the pump to the fluid cooling circuit. The unloaded pump may thus continue operating for a significant period of time without overheating.

The above and other objects, features, and advantages of the present invention are further disclosed in the following detailed description in conjunction with the drawings.

DESCRIPTION OF PREFERRED EMBODIMENTS

Figure 1:
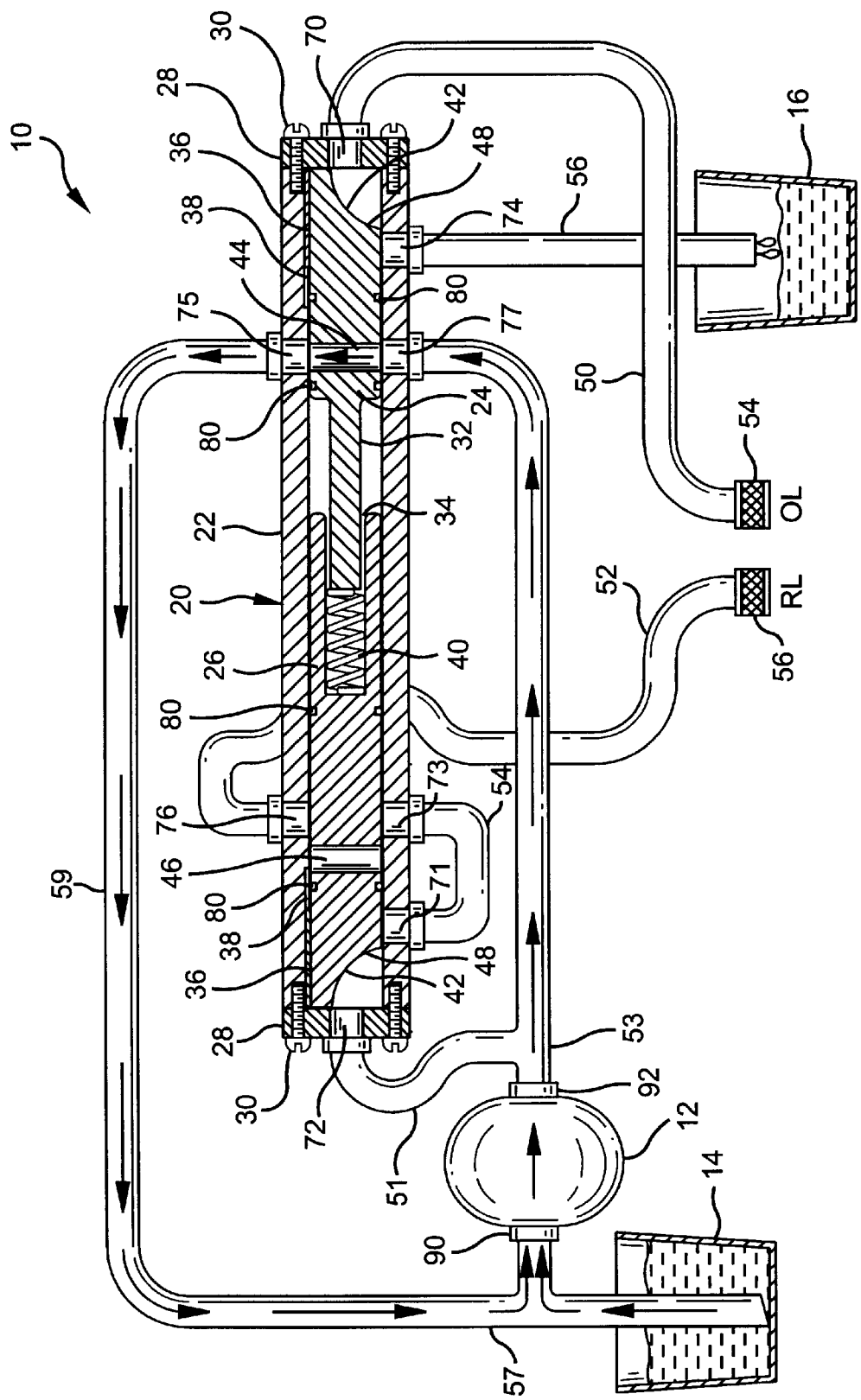
FIG. 1 is schematic view of a fluid exchange system according to the present invention operating in a bypass mode of operation.
Figure 2:
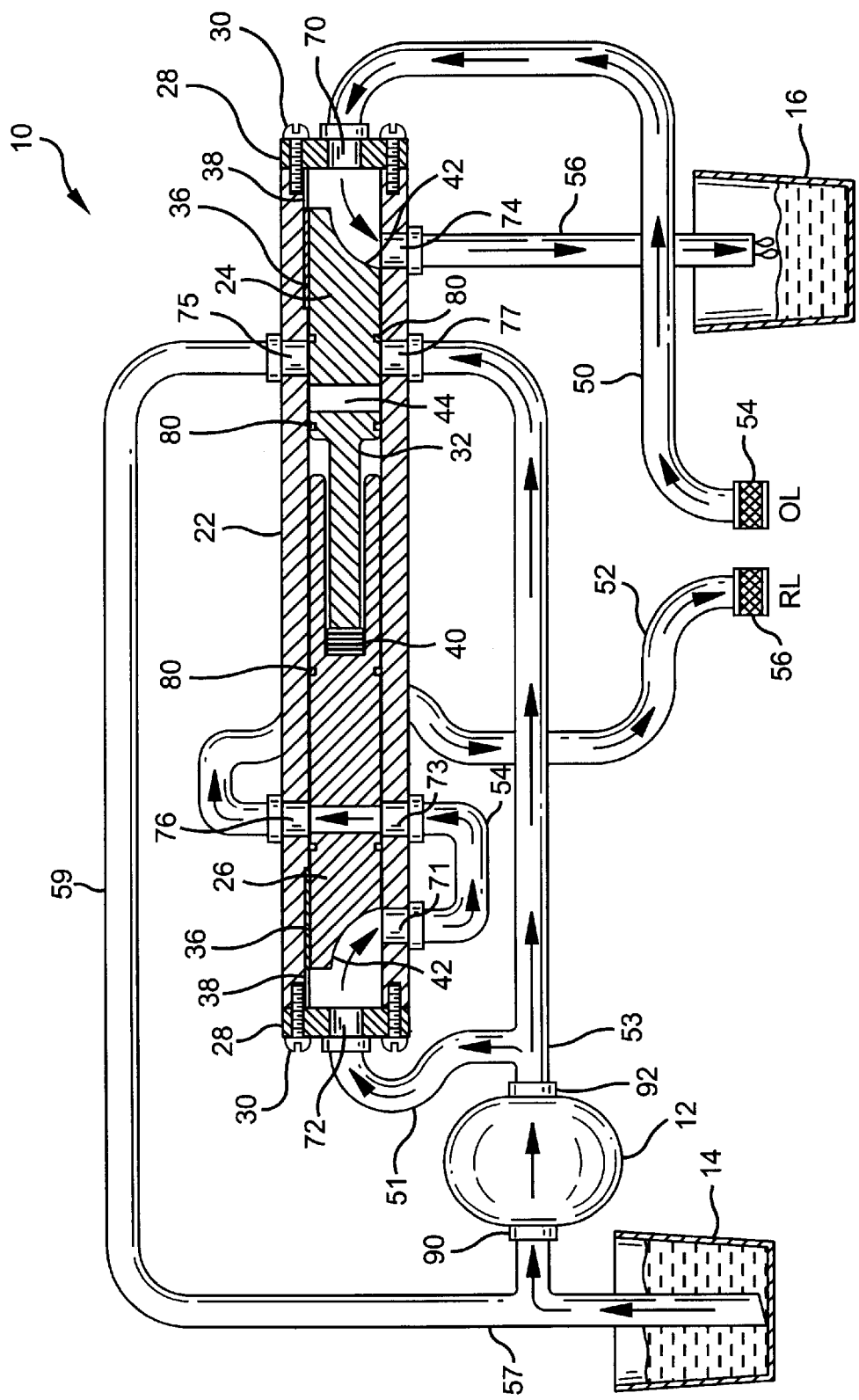
FIG. 2 is schematic view of a fluid exchange system according to the present invention operating in an operational mode of operation.
Figure 3:
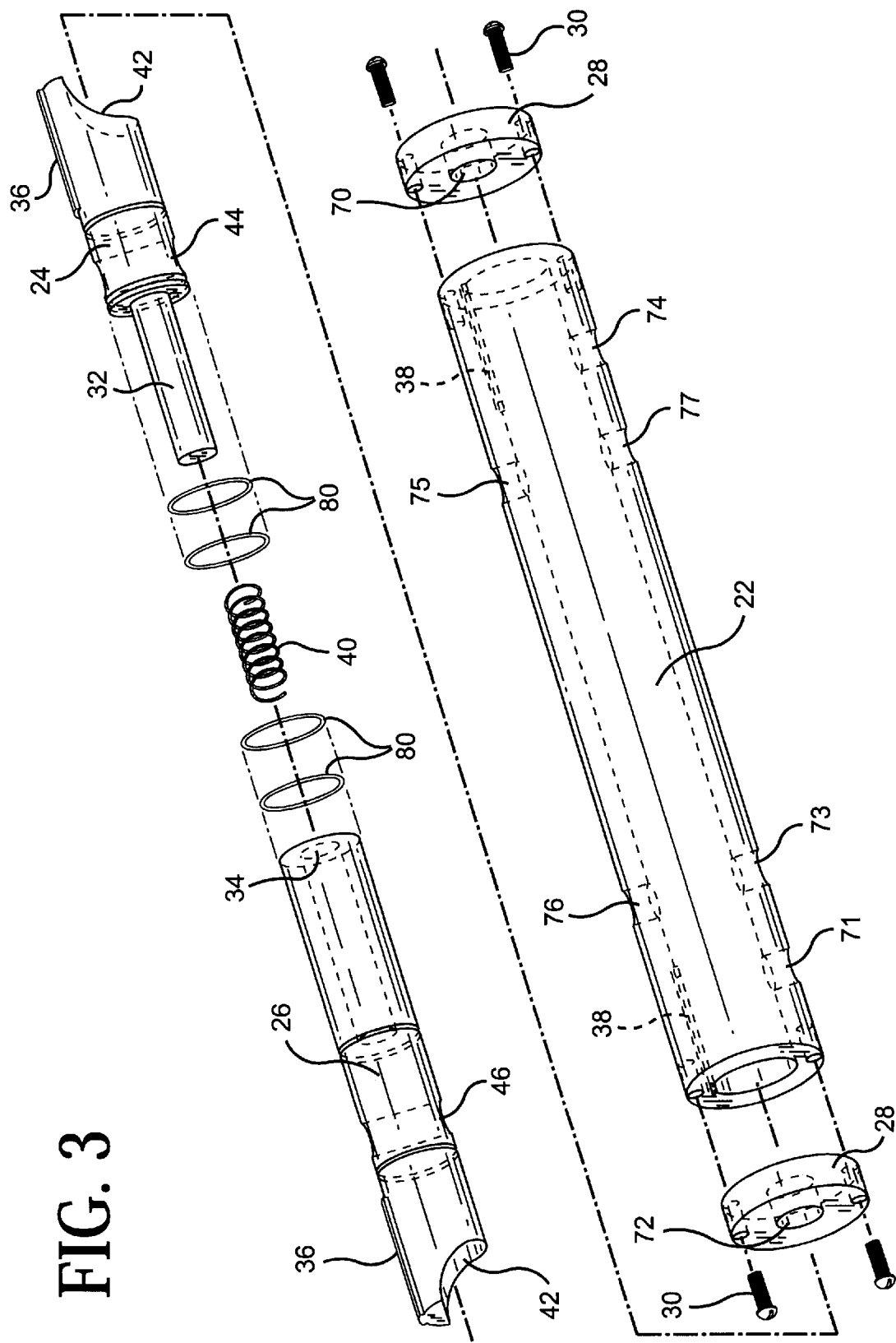
FIG. 3 illustrates an exploded perspective view of one embodiment of a control valve assembly.

Referring now to the drawings, where like numerals represent like parts throughout, FIGS. 1 and 2 are a schematic views of fluid exchange system 10 according to the present invention. FIG. 1 represent the exchange system 10 in a bypass mode of operation. FIG. 2 represent the exchange system 10 in an operational mode of operation. The exchange system has fluid coupled components including a fluid pump 12, a source of fresh ATF fluid 14, a used ATF receptacle 16, and a control valve assembly 20. It may be appreciated by those skilled in the art that the exchange system 10 of the present invention, while described herein in a preferred application for use with automotive automatic transmission, may be suitable for fluid exchange purposes for a variety of hydraulic systems, such as vehicles, airplanes, tractors, stationary hydraulic systems, etc.

FIG. 1 and 2 show a valve assembly 20 component of a fluid exchanger 10 for automatic transmissions in bypass mode and operational mode, respectively. The exchange system 10 includes a fluid conduit 50 which is interconnected to the outlet line side of the cooling circuit of the transmission (not shown). The exchanger 10 has a conduit 52 which is interconnected to the return line side of the cooling circuit of the transmission. As appreciated by those skilled in the art, conduit 50, 52 connections 54, 56 may be made directly to the outlet side and inlet side of the cooling circuit, or may be made to an intermediate flow correcting device (not shown) coupled between the cooling circuit and the exchange system 10 which aligns the exchange system 10 with the flow of circulated fluid of the cooling circuit.

Valve assembly 20 includes a valve body 22 and a pair of interiorly received valves 24, 26. The valves 24, 26 are slideably movable within the valve body 22 in response to fluid pressures introduced therein. The valve body 22 includes a pair of end caps 28, which are secured to valve body 22 by fasteners 30. End caps 28 may alternatively be temporarily or permanently secured to the valve body 22 through a variety of known mechanical, thermal, or chemical processes.

Referring to FIG. 1 and 2, the first valve 24 includes a narrow diameter portion 32 which is received into a cavity 34 of the second valve 26. Both valves 24, 26 include keyways 36 (which associate with keys 38 of the valve body 22) to prevent rotation of the valves 24, 26 but permit free lengthwise sliding within the valve body 22. A spring 40 is disposed between the valves 24, 26 and is sized to be received into the cavity 34 of the second valve 26. Spring 40 may be a variable rate spring.

Additional features of the valves 24, 26 include control surfaces 42 and internal bores 44, 46. Valves 24, 26 each have a control surface 42 which interacts with fluid introduced from respective ports 70, 72. Control surfaces 42 are defined as approximately semi-cylindrical portions removed from the ends of the valves 24, 26. It is appreciated that a control surface 42 may assume a variety of shapes or configurations, but will permit the valve 24, 26 to interact under pressures presented to the control surface 42 by fluid communicating through an associated valve body port 70, 72. Relatively sharp edges are formed along the control surface perimeters 48. Fluid passing through ports 70, 72 and impacting the sharp edges of valves 24, 26 cause the control surfaces 42 to be less sensitive to viscosity differences of the ATF fluid.

To promote fluid sealing, valves 24, 26 each have a pair of O-rings 80 installed in circumferentially cut grooves. The O-rings 80 do not substantially inhibit valve 24, 26 motion within the valve body 22. In other embodiments, the O-rings 80 may not be necessary as the clearance between the components may be minimized to promote fluid sealing.

Valve body 22 includes an inlet port 70 to which conduit 50 is connected. Inlet port 70 is arranged to provide fluid communication with the control surface 42 of valve 24. Valve body 24 has a outlet port 74 which is connected to a used fluid outlet conduit 56 which is arranged to deliver used fluid and diluted used fluid to the used fluid receiver 16.

The fluid pump 12, which may be a gear pump or other suitable pump, has an inlet port 90 and an outlet port 92. The pump 12 may have an internal relief valve to protect against overheating caused by an obstruction to fluid flow. The inlet port 90 of the pump 12 is coupled to the fresh fluid supply 14 via conduit 57 and a valve body bypass outlet port 75 via conduit 59.

The pump 12 outlet 92 is coupled to an inlet port 72 of the valve body 20 via conduit 51 to provide communication with valve 26, and to a bypass inlet port conduit 77 via conduit 53.

Valve assembly main outlet conduit 52 is coupled to the valve assembly 20 at port 76 and fluidly couples the exchange system 10 to the return line of the cooling circuit. Transition ports 71, 73 are fluidly coupled together through conduit 54. Used fluid outlet port 74 of valve assembly 10 is coupled to conduit 56 which in turn is associated with used fluid receptacle 16.

Bores 44 and 46 are cylindrical passageways through valves 24, 26 respectively, and provide (depending on the position of each valve 24, 26 within the valve body 20) variable fluid communication between respective ports 77, 75 and 73, 76. The sensitivity of the valve assembly 20 is a function of the bore 44, 46 diameter and is determined in research by tuning the ports and conduit size combinations used in the system.

Importantly, the valve assembly 22, 24, 26 and fluid conduits 50–57, 59 together define a feedback loop controller for controlling the pump 12 output. As may be appreciated by those skilled in the art, bore 44 and conduits 53, 59 define a feedback loop, with the extent of feedback determined by the variable flow rate of fluid through ports 77 and 75.

The specific progressive resistance profile of spring 40 is determined by the specific types and flow ranges of the transmissions that will be serviced. For example, if the apparatus is to be used to service large bus or truck automatic transmissions, the spring 40 will have a larger spring constant. Proper spring constant selection may be critical to the exchange system 10 functionability.

Operation of the First Embodiment

The fluid exchange device 10 of FIG. 1 is schematically depicted as interconnected to an opened cooling circuit of an automatic transmission prior to starting the engine.

Before the vehicle engine is started to render the transmission operative, the pump 12 may be activated to circulate fluid in a bypass circuit through bypass conduits 53, 59 as indicated by fluid flow arrows in FIG. 1. During the bypass mode, the valves 24, 26 are maintained in position by the spring 40 force. As can be appreciated, the force from fluid pressure at valve 26 control surface 42 is less than the spring reacting force. Valve body 22 ports 73, 76 and 77, 75 are aligned with bores 46 and 44, respectively. Desirably, the pump 12 may operate in its bypass mode for an extended period of time without overheating. The bypass mode may also be referred to full feedback mode, as the entire pump 12 output is fed back into the pump inlet 90.

Referring now to FIG. 2, upon starting the vehicle engine, used fluid is delivered under pressure of an internal pump (not shown) of the vehicle transmission, and is delivered into port 70 to displace valve 24. As valve 24 is displaced, used fluid is allowed to flow out of port 74 and through conduit 56 to be deposited in used fluid receiver 16.

As valve 24 is displaced toward its opposite end in valve body 20, it displaces bore 44 from ports 77, 75 effectively blocking the flow of fresh fluid through the bypass (feedback) circuit. This blocking of the bypass circuit causes fresh fluid to be delivered to port 72 through conduit 51 in increased pressure to displace valve 26 against spring 40, thereby allowing fresh fluid to flow out of port 71 through conduit 54, through bore 46, and then through conduit 52 to enter the return line side of the cooling circuit of the transmission. As illustrated in FIG. 2, the forces transmitted by the valves 24, 26 cause the spring 40 to collapse.

Low flow transmission pumps will displace valve only minimally exerting only minimal resistance against the fresh fluid entering port 72 from pump 12, but because valve 24 only minimally blocks bore 44, a relatively large bypass of fresh fluid is maintained and a minimal amount of fresh fluid is delivered to port 76 through conduit 54 to the return line side of the cooling circuit of the transmission.

High flow transmission pumps will displace valve 24 maximally closing bore 44 to prevent much if any fluid from bypassing and thereby allowing the full flow of pump 12 to bear on valve 26, which opens bore 46 significantly and allows fluid to flow through conduit 54 at a maximum flow level.

The motions of valves 24, 26 under fluid pressure of ports 70, 72 may be reciprocatedly related. That is, as one valve 24, 26 is displaced in a direction away from its inlet port 70, 72 it tends to cause the other valve 26, 24 to move toward its inlet port 72, 70. It may be appreciated that the reciprocal relation is constrained by the intermediate spring 40 dynamics.

Importantly, valve assembly 20 functions to permit the line pressure of fluid delivered from the internal pump of the transmission to exert priority or control over the flow output of the external pump 12 of the fluid exchange system 10.

I claim:

1. A fluid exchange system for use in exchanging a used fluid with a fresh fluid in a hydraulic system having a cooling circuit operatively connected to conduct a circulated fluid therein, said fresh fluid being contained in and dispensed from a source external to said hydraulic system, said used fluid initially being contained within said fluid cooling circuit and discharged into a receptacle external to said hydraulic system, said fluid exchange system comprising:

a first conduit adapted to be interconnected to the fluid exchange system, the source, and the fluid cooling circuit to conduct fresh fluid from the source into the fluid cooling circuit, a second conduit adapted to be interconnected to said fluid exchange system and the fluid cooling circuit to conduct used fluid from the fluid cooling circuit, said used fluid at a predetermined pressure and flow rate;

a pump assembly for delivering pressurized fluid to said first conduit; and a control mechanism operatively connected to the pump assembly and the first conduit and the second conduit, said control mechanism having a valve body having a plurality of ports and at least one valve received therewithin said valve body, said valve responding to a change in the predetermined pressure of the used fluid to vary an output of fresh fluid emitted from said fluid exchange system through said first conduit and into the cooling circuit, said at least one valve in fluid communication with both the used fluid and the fresh fluid.

2. A fluid exchange system according to claim 1, wherein the control mechanism further includes a pair of valves and an intermediate spring, all retained within the valve body.

3. A fluid exchange system according to claim 2, wherein the spring assembly transfers a force from one of the pair of valves to the other valve.

4. A fluid exchange system according to claim 3, wherein each of the pair of valves includes a bore for allowing fluid to pass therethrough.

5. A fluid exchange system according to claim 4, wherein a pair of the plurality of ports is aligned with a bore of at least on of the pair of valves.

6. A fluid exchange system according to claim 5, wherein one of the pair of ports is fluidly coupled to the pump to establish a feedback to the pump.

7. A fluid exchange system according to claim 1, wherein an output flowrate of fresh fluid introduced into the cooling circuit and the flowrate of used fluid extracted from the cooling circuit are substantially equal.

8. A fluid exchange system for use in exchanging a used fluid with a fresh fluid in a hydraulic system having a cooling circuit operatively connected to conduct a circulated fluid therein, said fresh fluid dispensed from a pressurized source external to said hydraulic system, said used fluid initially being contained within said fluid cooling circuit and discharged into a receptacle external to said hydraulic system, said fluid exchange system comprising:

a valve device having a valve body and at least one interiorly-received valve, said valve body having a plurality of ports, said at least one valve movable with respect to at least one of said plurality of ports, said at least one valve in fluid communication with both the fresh fluid and the used fluid;

a first conduit for receiving used fluid from the fluid cooling circuit and introducing said used fluid to the valve device at a used fluid inlet port at a predetermined pressure and flow rate;

a second conduit for receiving the pressurized fresh fluid and introducing said pressurized fresh fluid to the valve device at a fresh fluid inlet port;

a third conduit for receiving pressurized fresh fluid from an outlet port of said valve device, said third conduit coupled to the cooling circuit to introduce fresh fluid therein at a fresh fluid input flow rate; and wherein said at least one valve of the valve device responds to the predetermined pressure of the used fluid introduced from the first conduit to control a flow rate of fluid within the third conduit.

9. A fluid exchange system according to claim 8, wherein the at least one valve includes a pair of valves.

10. A fluid exchange system according to claim 9, further comprising:

a spring assembly, said spring assembly transfers a force from one of the pair of valves to the other valve.

11. A fluid exchange system according to claim 10, wherein each of the pair of valves includes a bore for allowing fluid to pass therethrough.

12. A fluid exchange system according to claim 11, wherein a pair of the plurality of ports is aligned with a bore of at least one of the pair of valves.

13. A fluid exchange system according to claim 12, wherein one of the pair of ports is fluidly coupled to pressurized source of fresh fluid to establish a feedback.

14. A fluid exchange system according to claim 11, wherein the input flowrate of fresh fluid introduced into the cooling circuit from the third conduit and the flowrate of used fluid extracted from the cooling circuit are substantially equal.

15. A method of exchanging used hydraulic fluid with new hydraulic fluid in a hydraulic fluid system having an internal pump and a fluid cooling circuit, said method comprising the steps of:

providing a receptacle of new hydraulic fluid;

providing a pump for pressurizing the new hydraulic fluid at a pump outlet; and coupling a pump controller between the pump outlet and the fluid cooling circuit, said pump controller having an inlet port coupled to the fluid cooling circuit for introducing used fluid at a predetermined pressure into the pump controller, said pump controller having a valve body and a valve received within the valve body, said valve in fluid communication with both the new hydraulic fluid and the used hydraulic fluid, said valve movable in response to changes in the predetermined pressure, wherein a flow rate of new hydraulic fluid introduced into the cooling circuit from the pump controller is dependent on the position of said valve within the valve body.

16. In a device for exchanging used hydraulic fluid from a hydraulic fluid system with new hydraulic fluid, said device comprising:

a flow rate control assembly, said control assembly having a valve body and an interiorly received valve, said control assembly having a plurality of ports in fluid communication with said valve, said valve in fluid communication with both the used hydraulic fluid and new hydraulic fluid;

a source of new hydraulic fluid;

a pump having an input coupled to the source of new hydraulic fluid and an output coupled to an input port of said plurality of ports of the control assembly;

a used fluid conduit coupled between the hydraulic system and the control assembly for allowing used fluid from the hydraulic system to flow to the control assembly at a predetermined used fluid flowrate and pressure; and a fresh fluid conduit coupled between the hydraulic system and the control assembly for allowing fresh fluid from the source of new hydraulic fluid to flow to the hydraulic system at a predetermined fresh fluid flowrate, wherein the predetermined fresh fluid flowrate is determined by a relative position of the valve within the valve body, said relative position depending on the used fluid pressure.

17. A method of exchanging used hydraulic fluid with fresh hydraulic fluid in an vehicle transmission having an internal pump and an external fluid cooling circuit, said method comprising the steps of:

providing a volume of fresh hydraulic fluid;

pressurizing at least a portion of said volume of hydraulic fluid;

providing a control assembly having a valve body having a valve received therein, said valve body further having a plurality of fluid ports for providing fluid communication of both the used hydraulic fluid and the fresh hydraulic fluid with said valve;

coupling the pressurized portion of said volume of hydraulic fluid to the control assembly at a fresh fluid inlet port;

connecting the control assembly to the cooling circuit so that used hydraulic fluid flows from the cooling circuit to a used hydraulic fluid inlet port of the control assembly, said used hydraulic fluid at a used hydraulic fluid pressure;

allowing the valve to move relative to the valve body in response to a change in the used hydraulic fluid pressure; and connecting the control assembly to the cooling circuit so that fresh hydraulic fluid flows from the control assembly to the cooling circuit, said fresh hydraulic fluid having an hydraulic fluid flowrate, said fresh hydraulic fluid flowrate varies in response to a change in a position of the valve relative to the valve body.

* * * * *